United States Patent
Ford et al.

(10) Patent No.: US 10,673,744 B2
(45) Date of Patent: Jun. 2, 2020

(54) METHODS, SYSTEMS, AND COMPUTER READABLE MEDIA FOR ADVANCED DISTRIBUTION IN A LINK AGGREGATION GROUP

(71) Applicant: Extreme Networks, Inc., San Jose, CA (US)

(72) Inventors: Jeffrey Allen Ford, Apex, NC (US); Donald Bruce Grosser, Jr., Apex, NC (US); Richard W. Graham, Derry, NH (US)

(73) Assignee: Extreme Networks, Inc., San Jose, CA (US)

( * ) Notice: Subject to any disclaimer, the term of this patent is extended or adjusted under 35 U.S.C. 154(b) by 35 days.

(21) Appl. No.: 14/975,094

(22) Filed: Dec. 18, 2015

(65) Prior Publication Data

US 2017/0085467 A1 Mar. 23, 2017

Related U.S. Application Data

(60) Provisional application No. 62/222,732, filed on Sep. 23, 2015.

(51) Int. Cl.
*H04L 12/709* (2013.01)
*H04L 12/733* (2013.01)

(52) U.S. Cl.
CPC ........... *H04L 45/245* (2013.01); *H04L 45/20* (2013.01); *Y02D 50/30* (2018.01)

(58) Field of Classification Search
CPC .............................. H04L 45/20; H04L 45/245
See application file for complete search history.

(56) References Cited

U.S. PATENT DOCUMENTS

| | | |
|---|---|---|
| 7,173,934 B2 | 2/2007 | Lapuh et al. |
| 8,730,963 B1 | 5/2014 | Grosser, Jr. et al. |
| 9,385,942 B2 | 7/2016 | Grosser, Jr. et al. |
| 9,882,817 B2 * | 1/2018 | Turlington .............. H04L 47/20 |

(Continued)

OTHER PUBLICATIONS

International Search Report and Written Opinion, dated Nov. 25, 2016, for PCT Appl. No. PCT/US2016/052918, 11 pages.

(Continued)

*Primary Examiner* — Khaled M Kassim
(74) *Attorney, Agent, or Firm* — Sterne, Kessler, Goldstein & Fox P.L.L.C.

(57) ABSTRACT

The subject matter described herein includes methods, systems, and computer readable media for advanced distribution in a link aggregation group (LAG). In some examples, a packet forwarding device includes physical ports for sending and receiving network traffic. The packet forwarding device includes one or more packet processors configured to perform LAG distribution by distributing incoming packets across active links of a first LAG formed between the packet forwarding device and one or more network devices. The incoming packets are in route to a destination device in communication with one of the network devices. The packet processors are configured, in an advanced distribution mode, to transmit a first packet of the plurality of incoming packets for the first LAG over a selected active link selected from a subset of the plurality of active links for the first LAG.

22 Claims, 7 Drawing Sheets

(56) References Cited

U.S. PATENT DOCUMENTS

| | | | |
|---|---|---|---|
| 2006/0227704 A1* | 10/2006 | Nakagawa | H04L 45/00 370/217 |
| 2006/0227711 A1* | 10/2006 | Nakagawa | H04L 41/0896 370/235 |
| 2006/0251106 A1* | 11/2006 | Nakagawa | H04L 47/41 370/456 |
| 2007/0294417 A1 | 12/2007 | Ikudome et al. | |
| 2008/0112312 A1* | 5/2008 | Hermsmeyer | H04L 45/00 370/228 |
| 2008/0112323 A1 | 5/2008 | Agmon et al. | |
| 2010/0316055 A1 | 12/2010 | Belanger | |
| 2010/0329147 A1 | 12/2010 | Nam et al. | |
| 2011/0075554 A1* | 3/2011 | Holness | H04L 1/22 370/228 |
| 2012/0054850 A1 | 3/2012 | Bhardwaj et al. | |
| 2012/0127999 A1* | 5/2012 | Grosser, Jr. | H04L 45/245 370/392 |
| 2013/0194914 A1 | 8/2013 | Agarwal et al. | |
| 2013/0215896 A1* | 8/2013 | Beecroft | H04L 12/4625 370/392 |
| 2014/0133486 A1* | 5/2014 | Sivasankar | H04L 47/41 370/392 |
| 2014/0198793 A1* | 7/2014 | Allu | H04L 45/245 370/392 |
| 2014/0201297 A1 | 7/2014 | Schmidt et al. | |
| 2014/0369186 A1* | 12/2014 | Ernstrom | H04L 41/0668 370/228 |
| 2015/0006755 A1* | 1/2015 | Turlington | H04L 47/20 709/233 |
| 2015/0026321 A1* | 1/2015 | Ravinoothala | H04L 45/245 709/222 |
| 2015/0188753 A1* | 7/2015 | Anumala | H04L 41/12 370/225 |
| 2015/0271061 A1* | 9/2015 | Byun | H04L 47/125 370/392 |
| 2015/0271104 A1* | 9/2015 | Chikkamath | H04L 12/4633 370/401 |
| 2015/0319083 A1 | 11/2015 | Grosser, Jr. et al. | |
| 2016/0234091 A1* | 8/2016 | Emmadi | H04L 43/12 |

OTHER PUBLICATIONS

International Preliminary Report on Patentability, dated Dec. 8, 2017, for PCT Appl. No. PCT/US2016/052918, 6 pages.

Notice of Allowance and Fee(s) Due for U.S. Appl. No. 14/266,784 (dated Mar. 2, 2016).

Non-Final Office Action for U.S. Appl. No. 14/266,784 (dated Oct. 6, 2015).

"Split Multi-link Trunking," Wikipedia online, p. 1-4.

Supplemental Notice of Allowability for U.S. Appl. No. 12/977,771 (dated Mar. 14, 2014).

Notice of Allowance and Fee(s) Due for U.S. Appl. No. 12/977,771 (dated Jan. 6, 2014).

"IEEE Standard for Local and Metropolitan Area Networks—Link Aggregation," 802.1AX (2014).

IEEE Draft P802.3ad/D3.1—Supplement to Information Technology—Local and Metropolitan Area Networks—Part 3: Carrier Sense Multiple Access with Collision Detection (CSMA/CD) Access Method & Physical Layer Specifications—Aggregation of Multiple Link Segments (Jan. 24, 2000).

Interview Summary for U.S. Appl. No. 12/977,771 (dated Jul. 9, 2013).

Final Official Action for U.S. Appl. No. 12/977,771 (dated Mar. 15, 2013).

Non-Final Official Action for U.S. Appl. No. 12/977,771 (dated Nov. 2, 2012).

* cited by examiner

METHODS, SYSTEMS, AND COMPUTER READABLE MEDIA FOR ADVANCED DISTRIBUTION IN A LINK AGGREGATION GROUP

PRIORITY CLAIM

This application claims the benefit of U.S. Provisional Patent Application Ser. No. 62/222,732, filed Sep. 23, 2015, the disclosure of which is incorporated herein by reference in its entirety.

TECHNICAL FIELD

The subject matter described herein relates to packet forwarding devices. More particularly, the subject matter described herein relates to packet forwarding devices with an advanced distribution mode for a link aggregation group (LAG).

BACKGROUND

Some packet forwarding devices can perform link aggregation for higher bandwidth circuits, resilience, and load balancing by forming a link aggregation group (LAG) of physical ports. For example, the Institute of Electrical and Electronics Engineers (IEEE) 802.3AD and IEEE 802.1AX define standards for some examples of link aggregation. By appropriately configuring a packet forwarding device, the physical ports and the link connected to them are logically coupled together to form a bundled set between two or more network nodes. The LAG then has a larger capacity than the individual member links of the LAG. The packet forwarding device can use an algorithm for traffic distribution across the member links. For example, some packet forwarding devices support a layer 2 based distribution mechanism based on hashing at least a portion of the layer 2 addresses or layer 3 or 4 addresses based distribution mechanisms often hashing some layer 3 or layer 4 information in the packets or traffic flow and using the hash results directly or indirectly to determine an output link.

Under certain circumstances, the resulting distribution of traffic across the member links of a LAG may not meet some system requirements or can lead to sub-optimal performance in some way. Accordingly, there exists a need for packet forwarding devices configured for further refinement of the traffic distribution across the member links of a LAG.

SUMMARY

The subject matter described herein includes methods, systems, and computer readable media for advanced distribution of traffic in a link aggregation group (LAG). In some examples, a packet forwarding device includes physical ports for sending and receiving network traffic. The packet forwarding device includes one or more packet processors configured to perform LAG distribution by distributing incoming packets across active links of a first LAG formed between the packet forwarding device and one or more network devices. The incoming packets are in route to a destination device in communication with one of the network devices. The packet processors are configured, in an advanced distribution mode, to distribute a first plurality of incoming packets of the plurality of incoming packets for the first LAG across a subset of active links for the first LAG.

In some examples, the system includes a first packet forwarding device including: a plurality of physical ports for sending and receiving network traffic; one or more packet processors for performing link aggregation group (LAG) distribution by distributing incoming packets for at least a first LAG between a plurality of active member ports for the first LAG; and a configuration selector. The configuration selector is configured for selecting an advanced distribution mode for performing LAG distribution, wherein the packet processors are configured, in the restricted or advanced distribution mode, to transmit a first packet of the plurality of incoming packets for the first LAG over a selected active link selected from a subset of the plurality of active links for the first LAG.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
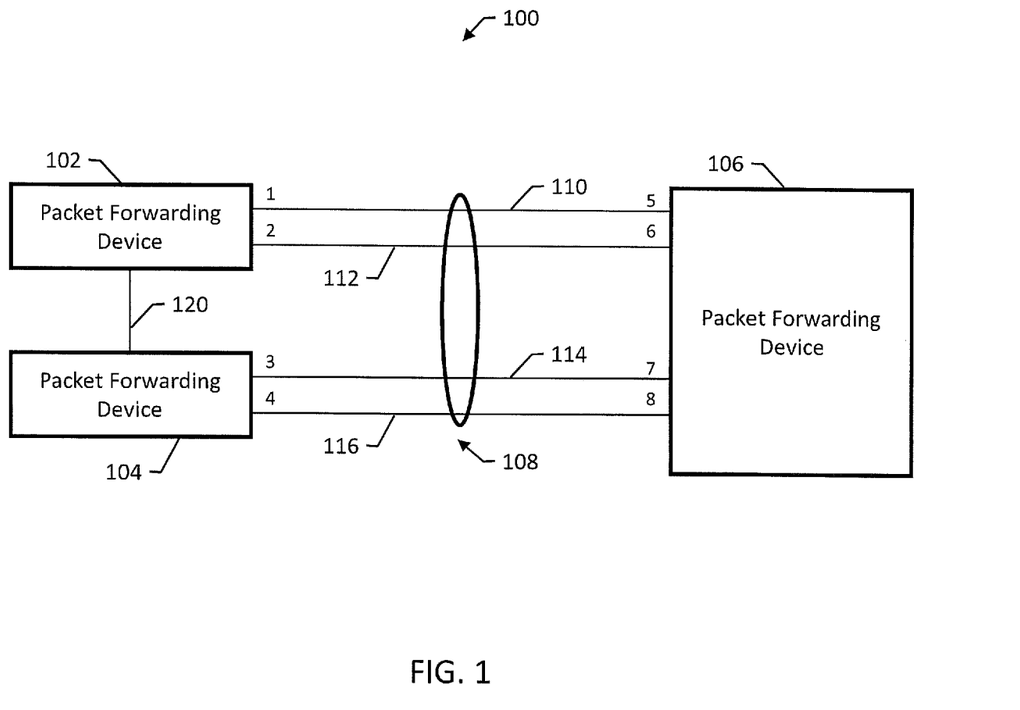
FIG. 1 is a block diagram illustrating an example network having example packet forwarding devices.

FIG. 1 is a block diagram illustrating an example network 100 having three example packet forwarding devices 102, 104 and 106. Packet forwarding devices 102, 104 and 106 have been configured, by virtue of appropriate programming, to implement a LAG 108 between physical ports (labelled 1, 2, 3, and 4) of packet forwarding devices 102 and 104 and physical ports (labelled 5, 6, 7, and 8) of packet forwarding device 106. LAG 108 includes four active member links 110, 112, 114 and 116. Although physical ports are illustrated, in some examples, LAG 108 may be implemented using one or more logical ports. Moreover, LAG 108 may include non-active member links, e.g., member links that have been shut down in response to detecting an error or logical or physical links only activated or used in certain circumstances.

In operation, packet forwarding device 102 is configured, by virtue of appropriate programming, to distribute traffic across member links 110, 112, 114, and 116 in a mode selected from one or more available distribution modes. In an unrestricted distribution mode, packet forwarding device 102 distributes traffic across all active member links of a LAG, e.g., using an appropriate distribution algorithm. In a restricted or advanced distribution mode, packet forwarding device 102 distributes traffic across a different set of the member links of the LAG. The selection of the distribution mode can be configured on a per-LAG basis, i.e., so that each LAG can be configured individually and may be configured differently based on the direction of the traffic in the LAG. In general, the selection of a distribution mode affects the distribution of unicast packets on a LAG; non-unicast packets are typically distributed among all member links of a LAG. In some advanced distribution modes, non unicast traffic will also be subject to at least one of a plurality of improved distribution rules.

In some examples, the restricted or advanced distribution mode can be a local-device distribution mode where packet forwarding device 102 distributes traffic exclusively to physical ports on packet forwarding device 102 when there is at least one physical port for the LAG on packet forwarding device 102. In general, the local-device distribution mode restricts distribution of unicast packets to the member links of the LAG on the same device where the packet was received. If no member links of the LAG are present on the device where the packet was received, all LAG member links are included in the distribution algorithm or other improved or advanced modes of operation may be used. Other improved modes of operation may include the "closest" link or other selection techniques as will be further described.

For example, suppose that packet forwarding device 102 receives a packet destined for packet forwarding device 106. In an unrestricted distribution mode, packet forwarding device 102 uses a distribution algorithm to determine whether to transmit the packet on one of member links 110 and 112 or on one of member links 114 and 116 by way of packet forwarding device 104. In local-device distribution mode, packet forwarding device 102 uses a distribution algorithm which only includes "local" ports to determine whether to transmit the packet on one of member links 110 and 112, using physical ports 1 and 2 which are physically located on packet forwarding device 102. Packet forwarding device 102 will not transmit the packet to packet forwarding device 104 for transmission on one of member links 114 and 116. As shown in FIG. 1 device 102 and 104 are interconnected by link 120. Link 120 may not have enough bandwidth to support all the external ports of device 102 for normal packet forwarding of the devices and in addition support for traffic destined for links 114 and 116 of LAG 108. A "local" distribution mode forces traffic to support LAG members local to the device only or local to the device as a first choice or local until certain traffic levels are reached on LAG member port or based in part on traffic loading on interconnect 120.

Packet forwarding device 102 can be configured into the local-device distribution mode at the time of LAG creation, e.g., as a parameter with the same command line interface (CLI) command to create a LAG. Packet forwarding device 102 can also be dynamically configured, during operation, to select the local-device distribution mode or another mode. In some examples, packet forwarding device 102 is configured, by virtue of appropriate programming, so that the local-device distribution mode is self-configuring, i.e., so that no further configuration is required other than selecting the local-device distribution mode. Packet forwarding device 102 may automatically handle addition or deletion of LAG member ports so that packet forwarding device 102 continues to restrict distribution of traffic to LAG member links on the same device where the traffic is received or may enter this mode based on loading bandwidth uses or needs on links internal and external to devices and other device and link characteristics.

In some examples, the advanced distribution mode can be a port-list distribution mode where packet forwarding device 102 distributes traffic exclusively to a number of user-configurable physical ports of the LAG on packet forwarding device 102. The port-list distribution mode provides the user with the ability to configure one or more LAG member ports to be eligible for unicast LAG distribution on, e.g., each slot in the packet forwarding device. If a slot does not have a distribution port list configured or if none of the configured member ports is active in the LAG, then all active member ports are eligible for unicast distribution or in some examples a secondary distribution method may be defined or specified.

The port-list distribution mode may be specified during LAG creation, e.g., with a CLI command. It may also be configured dynamically with a different command. The use of the port-list distribution mode should be taken into consideration when adding ports to a LAG during operation. Any newly added port on a LAG may not be available for unicast, multicast or broadcast distribution unless it is also added to the distribution port list of at least one slot.

LAG distribution modes may be implemented using many different mechanisms and carried out using any appropriate combination of hardware, software, and firmware. Example LAG distribution modes can be implemented using one or more of the following features:

1. Processing packets with a LAG distribution mechanism that includes hashing various fields of the packets in all packets or in a flow of packets on a device;
2. Processing packets by performing table lookups based on all or certain selected packet fields in the packets;
3. Executing a LAG distribution mechanism that uses combinatorial or algorithmic combination of bits, bytes, fields or portion of fields of packets;
4. Executing a LAG distribution mechanism that uses device, device link and network link status and capabilities and other characteristics of devices and links;
5. Processing packets with a LAG distribution mechanism that includes one or more of simple assignments, compression mechanisms, and content-addressable memories (CAMs);
6. Executing a LAG distribution mechanism that uses a sequence of processes, such as first hashing selected address bytes or selected fields, then performing a table selection, and then performing a table lookup to select an active member link of a LAG.

Figure 2:
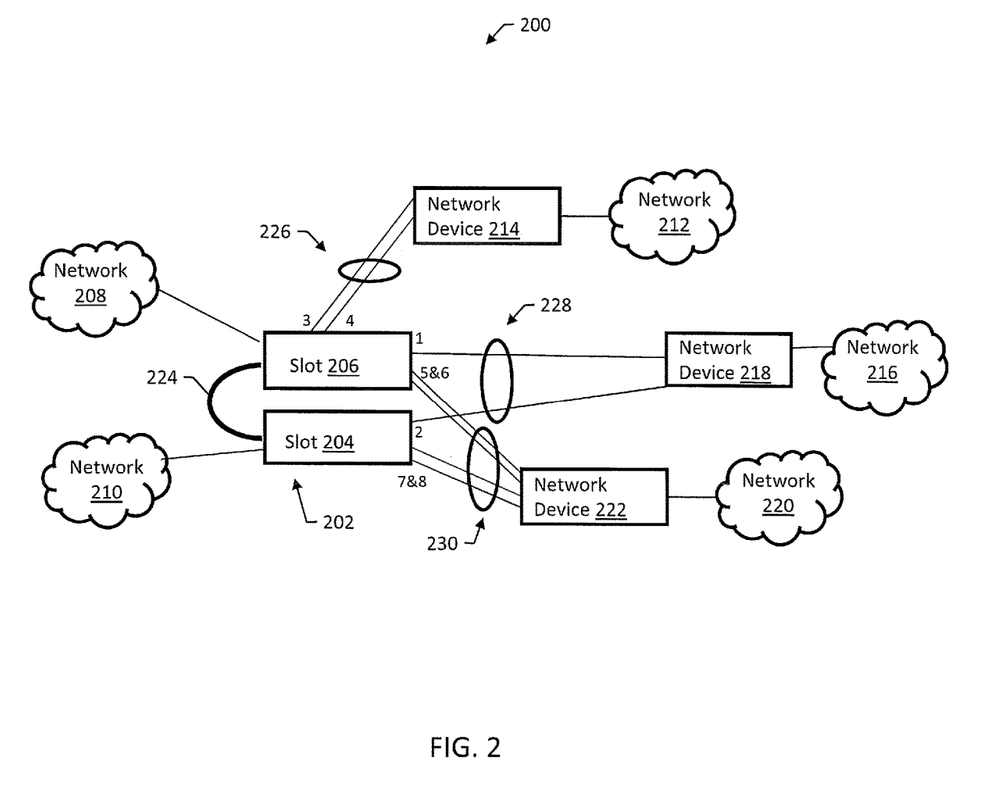
FIG. 2 is a block diagram of an example network including an example packet forwarding device having two slots.

FIG. 2 is a block diagram of an example network 200 including an example packet forwarding device 202 having two slots 204 and 206. Slots 204 and 206 can be physically stacked, so that packet forwarding device 202 is a stacked device or each slot may represent an actual slot in a chassis device. Each slot is occupied by an input/output (I/O) module having a number of physical ports for communicating packets to and receiving packets from connected network nodes, such as servers, personal computers, routers, etc. and may include wired or wireless interfaces.

Packet forwarding device 202 can be configured, by virtue of appropriate programming, to perform layer 2 switching and layer 3 packet forwarding, where layers 2 and 3 refer to the corresponding layers in the OSI (Open Systems Interconnection) model protocol stack. Each slot can include in the module occupying the slot, zero, one or more packet processors. A packet processor comprises any appropriate combination of hardware, software, and firmware that is configured, by appropriate programming and/or hardware configuration, to process packets. For example, a packet processor can be a general purpose processor configured to process packets by executing software stored in memory. A general purpose processor may be configured to implement multiple packet processors, e.g., using multi-threading or other appropriate multitasking technology. In another example, a packet processor can be in or part of a field programmable gate array (FPGA) or application specific integrated circuit (ASIC). FPGAs and ASICs can be configured using design software, e.g., using a hardware description language (HDL). The packet processor may include content-addressable memories (CAMs), ternary CAMs (TCAMs), tables, memories and other either integral or support capabilities as part of its operation and design and may include specialized functions either centralized or distributed.

The packet processors perform packet forwarding operations using packet forwarding information stored in a memory type structure, e.g., a routing table, a next hop table, and/or a table storing LAG information. LAG information can include egress slot and port information for LAG groups and other data such as a selected distribution mode and/or a selected distribution algorithm. Packet processors may be centralized or distributed functions within the packet forwarding device. Packet processors may also include hardware and/or software capabilities, along with support functions for storage and packet examination and manipulation to receive, examine, modify and/or transmit the packets within a packet forwarding device.

In example network 200, packet forwarding device 202 is coupled to networks 208 and 210. Packet forwarding device 202 is also coupled to network 212 by network device 214, network 216 by network device 218, and network 220 by network device 222. Slot 206 is coupled to slot 204 by stacking cable 224. Packet forwarding device 202 is configured to create a first LAG 226 with network device 214 on port 3 and 4 of slot 206, a second LAG 228 with network device 218 on port 1 of slot 206 and port 2 of slot 204, and a third LAG 230 with network device 222 on ports 5 and 6 of slot 206 and ports 7 and 8 on slot 204. The example network 200 may also be configured to forward packets between packet forwarding device 202 and at least one of network 208 or network 210, either directly or indirectly. The example network 200 may further be configured to forward packets via the first LAG 226, the second LAG 228, or the third LAG 230, wherein each LAG may be in communication with the packet forwarding device 202 or any of the network devices 214, 218, 222, and wherein each network device may be in communication with any of networks 208, 210, 212, 216, 220.

In some examples, the stacking cable 224 may be oversubscribed by the sum of all the bandwidth of the front-panel ports (not all shown), i.e., the stacking cable 224 can carry an amount of traffic less than the other external ports of slots 204 and 206. When traffic is received on slot 206 from network 208 which is destined to network 216, it will be distributed across both port 1 and port 2 of LAG 228, so that traffic sent to port 2 travels across stacking cable 224 using the relatively scarce bandwidth of stacking cable 224. The traffic sent to port 1 does not need to travel to slot 204 and therefore does not use the relatively scarce bandwidth of stacking cable 224.

The potential oversubscription of stacking cable 224 in the situation described immediately above could be remedied with a more complicated configuration and port-based sharing such that traffic from the port connected to network 208 is always distributed to port 1 for traffic destined to network 216. Likewise, it may be desirable to distribute traffic from network 208 to network 220 over ports 5 and 6 based on an enhanced distribution mode while at the same time distributing traffic from network 210 to network 220 over ports 7 and 8 based on a further enhancement to the distribution mode, eliminating the need for stacking cable 224 usage in various cases of LAG packet transmission.

Slot 206 could alternately be configured into a "local-slot distribution" mode, i.e., as described above with reference to the local-device distribution mode of FIG. 1. In the local-slot distribution mode, local switching of traffic received on slot 206 is performed only to LAG member links resident on slot 206, which can significantly reduce the traffic required to traverse stacking cable 224. Switching of traffic received on slot 206 can be optimized to certain LAG member links physically closer to slot 206, e.g., by minimizing stack traversal in a stacked device and reducing end-to-end latency.

When slot 206 is in the local-slot distribution mode, traffic received from network 208 destined for network 216 will be switched to port 1 and not port 2. Traffic received from network 208 destined for network 220 will be sent across ports 5 and 6 and not ports 7 and 8. Traffic received from network 208 destined for network 212 will be unaffected, i.e., the traffic will continue to be distributed across ports 3 and 4. Similarly, slot 204 can be configured into a local-slot distribution mode, so that traffic received from network 210 destined for network 216 is switched to port 2 and not port 1, and so that traffic received from network 210 destined for network 220 is sent across ports 7 and 8 and not ports 5 and 6.

Figure 3:
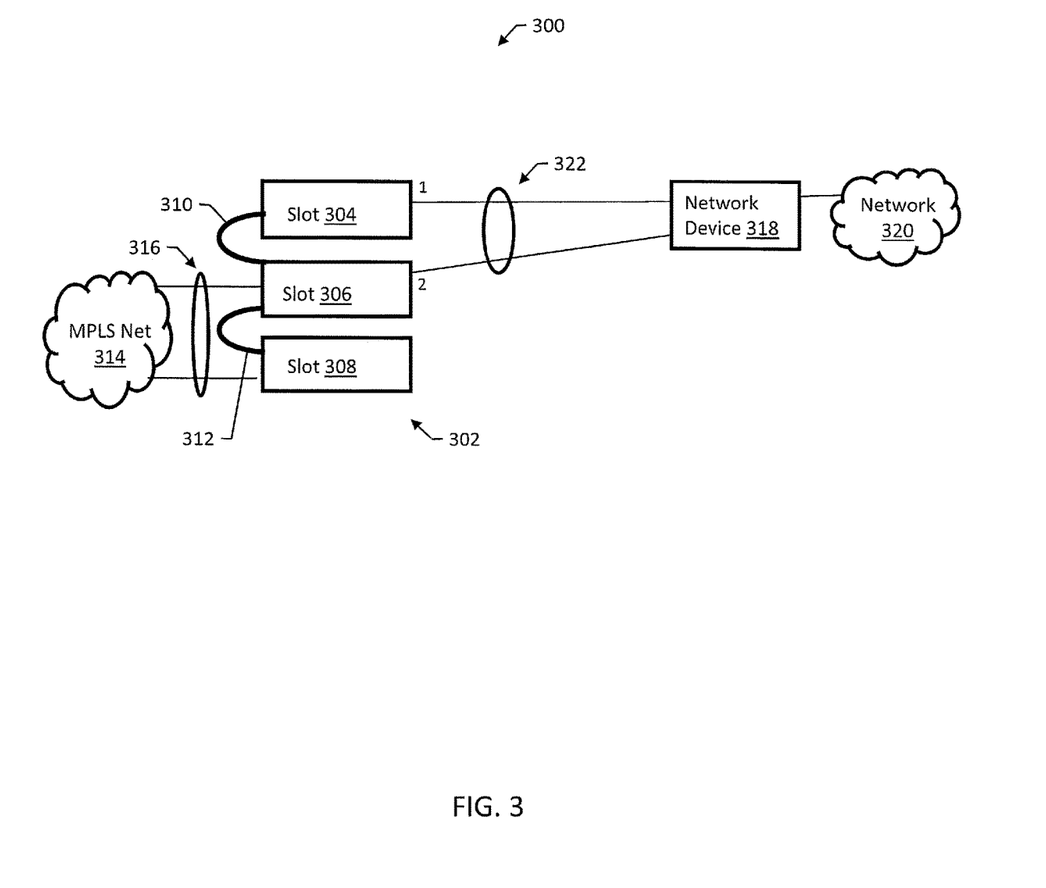
FIG. 3 is a block diagram of an example network including a stacked packet forwarding device.

FIG. 3 is a block diagram of an example network 300 including a stacked or slotted packet forwarding device 302. Packet forwarding device 302 includes three slots 304, 306, and 308, each occupied by an I/O module. Slots 304 and 306 are coupled by a first interconnect/stacking cable 310, and slots 306 and 308 are coupled by a second stacking cable 312. Packet forwarding device 302 is coupled to a multiprotocol label switching (MPLS) network 314 by a first LAG 316. Packet forwarding device 302 is also coupled to another network 320 by a network device 318 and a second LAG 322.

For example, packet forwarding device 302 may be used by an Internet Exchange Provider (IXP), where Virtual Private LAN Services (VPLS) are received by packet forwarding device 302 over LAG 316, MPLS is terminated, and native Ethernet frames are transmitted on LAG 322, which can be a customer access port. Some IXPs may be peering Border Gateway Protocol, (BGP) so that the number of MAC addresses encapsulated in the VPLS network is small but the number of IP addresses encapsulated in the VPLS network is large.

In that case, some conventional LAG packet distribution functions using hashing capabilities may not be sophisticated enough to provide a desirable distribution of network traffic (i.e. packets, data, etc.) across LAG member links. To provide a good, i.e., relatively even, distribution across LAG member links, the packet forwarding device 302 could use a hash or other computational method based on the payload IP addresses. But some implementations may not have such capability, yielding a poor LAG member link distribution.

Instead, packet forwarding device 302 can be placed into a port-list distribution mode, i.e., as described above with reference to FIG. 1. Using the port-list distribution mode can result in improved traffic LAG re-distribution for traffic received on a LAG with good distribution or for traffic received on multiple network segments (e.g. L3 Equal-Cost Multi-Path routing (ECMP)) with good distribution where a re-distribution operation is not needed or even desirable. The re-distribution may not be desirable due to implementation distribution limitations (e.g. hardware cannot hash on L3 header of an MPLS encapsulated payload), network polarization concerns, or otherwise.

Referring to FIG. 3, LAG 322, which may be formed using port 1 and port 2, can be configured to distribute traffic from slot 306 to port 1 and from slot 308 to port 2. Since the MPLS LAG distribution is good, this will ensure that the access LAG distribution will be equally good even when the packet hashing distribution would not have been.

Figure 4:
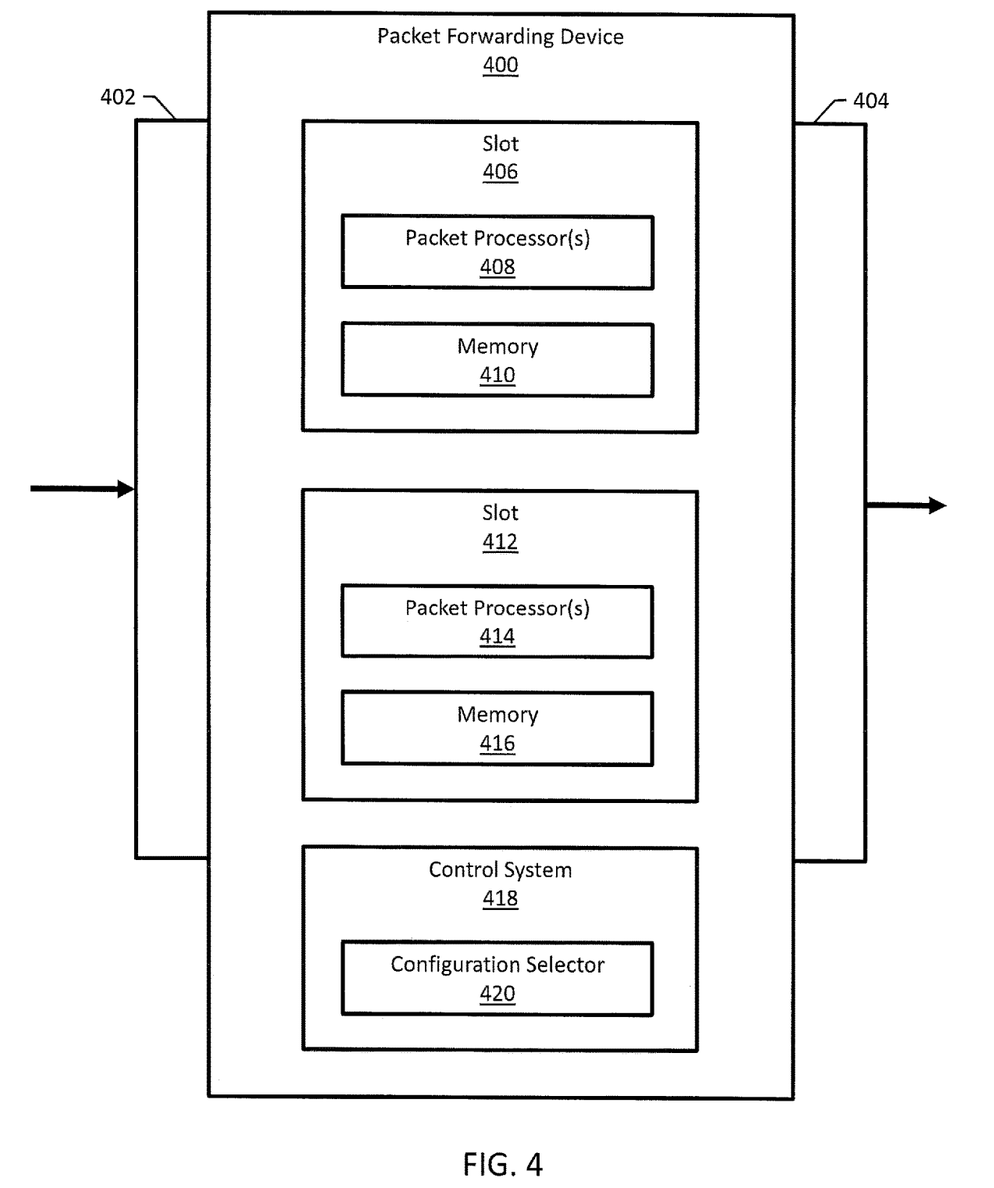
FIG. 4 is a block diagram of an example packet forwarding device.

FIG. 4 is a block diagram of an example packet forwarding device 400. Packet forwarding device 400 may include one or more physical ports 402 for receiving network traffic and one or more physical ports 404 for sending network traffic. Packet forwarding device 400 may also include multiple slots for I/O modules, including slot 406 and slot 412. Slot 406 is occupied by an I/O module including one or more packet processors 408 and memory storing, e.g., packet forwarding information. Slot 412 is occupied by an I/O module including one or more packet processors 414 and memory storing, e.g., packet forwarding information. In operation, packet processors 408 and 414 perform LAG distribution by distributing incoming packets for at least a first LAG between active member ports for the first LAG.

Packet forwarding device 400 includes a control system 418, which can be implemented by a system of one or more computers configured, by virtue of appropriate programming, to configure slots 406 and 412. Control system 418 includes a configuration selector 420 for selecting a distribution mode for slots 406 and 412. For example, configuration selector 420 can be configured to select an unrestricted distribution mode where packet processors distribute packets to selected links from the set of all member links of a LAG or a restricted or advanced distribution mode.

The configuration selector 420 can be configured to receive user commands, e.g., from a user computer device in communication with packet forwarding device 400. The user computer device may be executing a graphical user interface (GUI) or a command line interface (CLI) for providing user commands to packet forwarding device 400. Consider the following example user commands that can be used to provide input to configuration selector 420.

"Enable sharing." One example user command is an "enable sharing" command to create a LAG. The "enable sharing" command can be enhanced to support the local-device (e.g., local-slot distribution) and port-list distribution modes. An example template for the "enable sharing" command is provided below:

enable sharing <master_port> grouping <member_port_list>{algorithm [address-based {L2|L3|L3_L4|custom}|port-based]}{distribution-mode [all|local-slot|port-lists]} {lacp|health-check} distribution-mode options:

all—All active members of the group are eligible for distribution on all slots in the switch. This can be the default.

local-slot—If there are one or more active members of the group on the slot where traffic is received, distribution will be restricted to these "local-slot" members.

port-lists—If there are one or more active members of the group in the configured distribution port list for the slot on which traffic is received, distribution will be restricted to these configured ports.

"Configure sharing." Another example user command is a "configure sharing" command to dynamically configure an existing LAG. An example template for the "configure sharing" command is provided below:

configure sharing <master_port> distribution-mode [all|local-slot|port-lists]

distribution-mode options:

all—All active members of the group are eligible for distribution on all slots in the switch. This can be the default.

local-slot—If there are one or more active members of the group on the slot where traffic is received, distribution will be restricted to these "local-slot" members.

port-lists—If there are one or more active members of the group in the configured distribution port list for the slot on which traffic is received, distribution will be restricted to these configured ports.

"Configure sharing." Another example user command is a "configure sharing" command for configuring, modifying, and deleting per-slot distribution port lists. An example template for the "configure sharing" command is provided below:

configure sharing <master_port> slot <slot> distribution-list [<port_list>|add <port_list>|delete <port_list>|all]

distribution-list options:

<port_list>—Configures a port list for the given slot for the port-list distribution mode. If there are one or more active members of the group in the configured distribution port list for the slot on which traffic is received, distribution will be restricted to these configured ports. If a port list is already configured for the given slot, it will be overwritten. This command does not require that the LAG is currently configured to use the port-list distribution mode.

add <port_list>—Adds a port list to the existing distribution port list for the given slot.

delete <port_list>—Removes a port list from the existing distribution port list for the given slot.

all—All active members of the group are eligible for distribution for packets received on the given slot. This option effectively deletes any existing configured port list for the slot.

Control system 418 can also be configured to respond to user commands for displaying packet forwarding information. For example, "show sharing" and "show ports <port_list> sharing" commands can be used to support the display of the distribution mode for a LAG. The "show sharing" and "show ports <port_list> sharing" commands can be extended to support the display of the configured distribution mode and distribution port lists for LAGs in the port-list distribution mode.

Other commands may be added as is known by those skilled in the art to control other added, different and more elaborate mechanisms to help classify and distribute traffic on LAG members.

Figure 5:
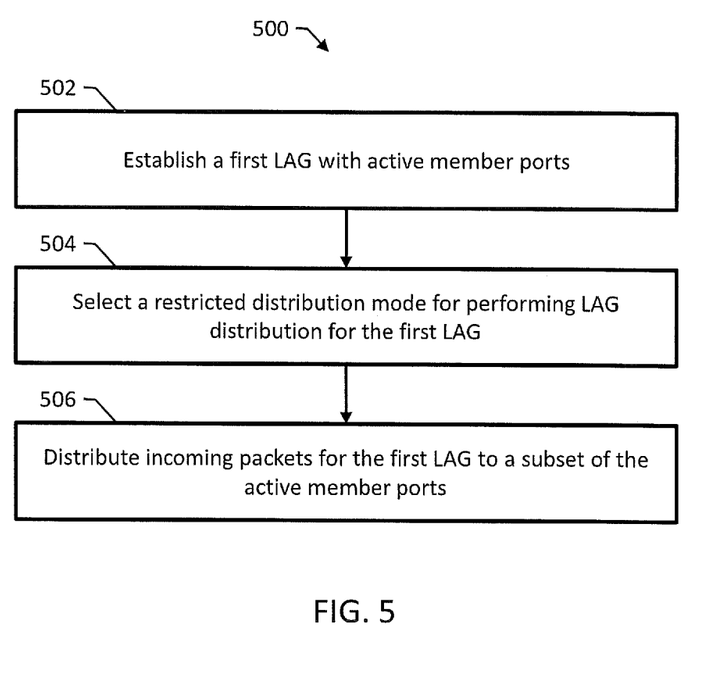
FIG. 5 is a flow diagram of an example method performed by a packet forwarding device comprising one or more packet processors.

FIG. 5 is a flow diagram of an example method 500 performed by a packet forwarding device comprising one or more packet processors. The packet forwarding device establishes a first LAG for distributing incoming packets between active member ports for the first LAG (502). The packet forwarding device selects a restricted or advanced distribution mode for performing LAG distribution for the first LAG (504). The packet forwarding device distributes incoming packets for the first LAG to a subset of the active member ports (506). The distribution algorithm generally has two parts to consider in its operation. The first portion is an attempt to restrict traffic from the same source and destination pair to the same outgoing link for each service the pair supports. This traffic is typically called a "traffic flow" or just "flow" as is well known to those in the art. This process insures good packet ordering capabilities for packets to that destination from that source using a specific protocol or function. The second portion of the distribution function attempts to load level all the "flows" on a LAG across all the members of the LAG as evenly as possible, providing the best service. The restricted or advanced distribution modes can be a local-device distribution mode or a port-list distribution mode, and while each flow is sent over the same link, it chooses which link from a set of links which may not include all links defined as part of the LAG.

Figure 6:
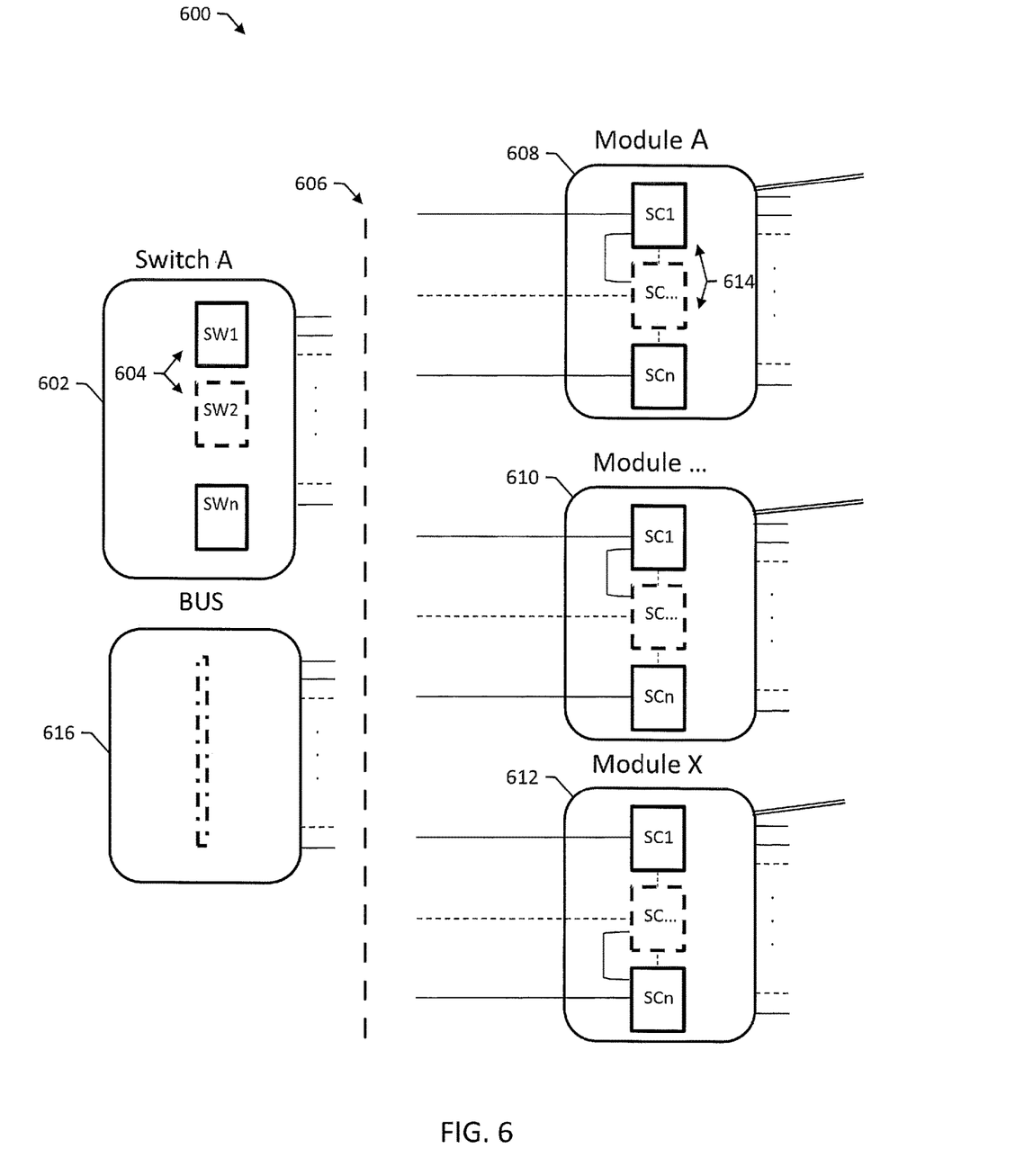
FIG. 6 is a block diagram of an example a set of packet forwarding systems implemented in a modular fashion comprising multiple internal building blocks.

FIG. 6 is a block diagram of an example packet forwarding system 600 implemented in a modular fashion comprising multiple internal building blocks. The building blocks can be, e.g., chips, chip modules, boards, boxes, dedicated interconnects, standard link interconnects (e.g., buses, wires, fiber, wireless).

Packet forwarding system 600 generally includes one or more switching modules A-X 608, 610, 612 comprising physical ports for receiving and sending network traffic, one or more hardware circuits for switching the network traffic, and a switching controller (SC) 614. The switching controller may be configured, by virtue of appropriate programming, to cause the hardware circuits to distribute incoming packets belonging to a link aggregation group (LAG) to one or more active member ports for the LAG based on one or more traffic characteristics (loading, latency, traffic type) or physical characteristics (link speed, forwarding chips, chip interconnects, board interconnects, BW of interconnects, number of LAG members active, etc.) of the packet forwarding system. The switching controller 614 may include a memory, packet processing mechanisms, such as processors, microcontrollers, hardware logic, tables, content-addressable memories (CAMs) or some or all these capabilities configured to switch network traffic between the physical ports. The packet processing mechanisms may also include hardware circuits, hardware logic circuits, or other logic and processing architectures known to those of ordinary skill in the art. The characteristics can include, e.g., a distance to the destination hardware circuit, a latency to the destination device, whether or not the destination device is on a same physical platform, and a priority or QOS mechanism. The characteristics can be defined by a system engineer or determined by a trained classifier or other intelligent software component.

In the example illustrated in FIG. 6, packet forwarding system 600 may also include at least one switching module 602 having a number of switch chips 604. Switch 602 and/or bus module 616 may be part of coupled to a backplane 606. Packet forwarding system 600 may also include a number of external modules 608, 610, and 612 each including a number of switching chips 614 or switching controllers 614. Switching chips or controllers 614 may come in different types and specifications (i.e., speed, capacity, etc.) for the support of different external interfaces. Modules 608, 610, and 612 may each be coupled to the backplane 606. A system bus 616 may also be coupled to the backplane 606 in some system configurations.

System 600 is a representation of the tradeoffs which can be made at system design time, system configuration/reconfiguration time, or by software configurations and settings made for a specific hardware configuration. Based on customer needs certain of module type modules 608, 610, 612 may be designed, built or selected for port speed, port density, internal bandwidth limitations or protocols in use. High density modules may have more switching chips or added local processing capabilities. This flexible architecture, design and configuration selection, along with parameter selections capability, helps drive a further need for flexibility to support more advanced LAG distribution capabilities, mechanisms and features.

Each of the switching components of packet forwarding system 600 can be configured to selectively route traffic for a LAG based on parameters such as bandwidth, loading, delay or other characteristics of packet forwarding system 600. For example, switch 602 or module 608 can be configured to determine, from a number of active LAG member ports, which next component corresponds to an active LAG member link having a smallest value for one of the internal or external port loading characteristics. In some examples, a component determines a next component by recognizing the active LAG member link from the following list, in an established order of priority:

1. The local chip
2. The nearest chip
3. Local port on same board/module
4. Same box
5. Same stack
6. Same chassis Packets in a flow of packets could then use the same LAG link or advanced distribution method.

Various factors can define the architecture of packet forwarding system 600 and the devices, chips, subsystems, and modules present in packet forwarding system 600. For example, packet forwarding system 600 can use the following factors to define a path from component to component within packet forwarding system 600 for traffic destined for a LAG:

1. Reliability, e.g., where a chip-to-chip connection is more than reliable than an inter-module connection
2. Scalability, e.g., where an intelligent algorithm can recognize a use of LAG members to prepare the system for an application with certain network requirements, e.g., voice over IP (VOIP), e.g., using an application identifier
3. Failure attributes, e.g., whether external failures or internal failures are more frequent
4. Redundancy
5. Port counts and port bandwidth, e.g., send low priority traffic to ports with lower bandwidth
6. Chip interconnect buses
7. Chip interconnect switching
8. Hops to the destination
   a. chip
   b. module
   c. box(device)
   d. "cost"
   e. Link "cost" (speed/latency/hops/delay)
9. Latency
10. Priority mechanisms
11. Configuration
12. Complexity, e.g., computational complexity in determining which LAG member to route traffic to use
13. Software complexity and modularity
14. Cost In some examples, a software defined network (SDN) controller can be used to define paths through networks using packet forwarding system 600 and internal LAG capabilities for traffic distribution. The SDN controller can help determine, e.g., which active LAG members should be used within a given LAG by packet forwarding system 600 based on known or measured characteristics of the system as it is currently configured and operating. The SDN controller can determine at least one characteristic for a path through the network for a given packet flow using packet forwarding system 600 by specifying, e.g., the shortest path, lowest delay, etc. for certain traffic on a path. The at least one path characteristic can then be used by system 600 to influence the LAG distribution methods to improve the specified SDN attributes requested, or SDN mechanisms may simply define the path or link.

Figure 7:
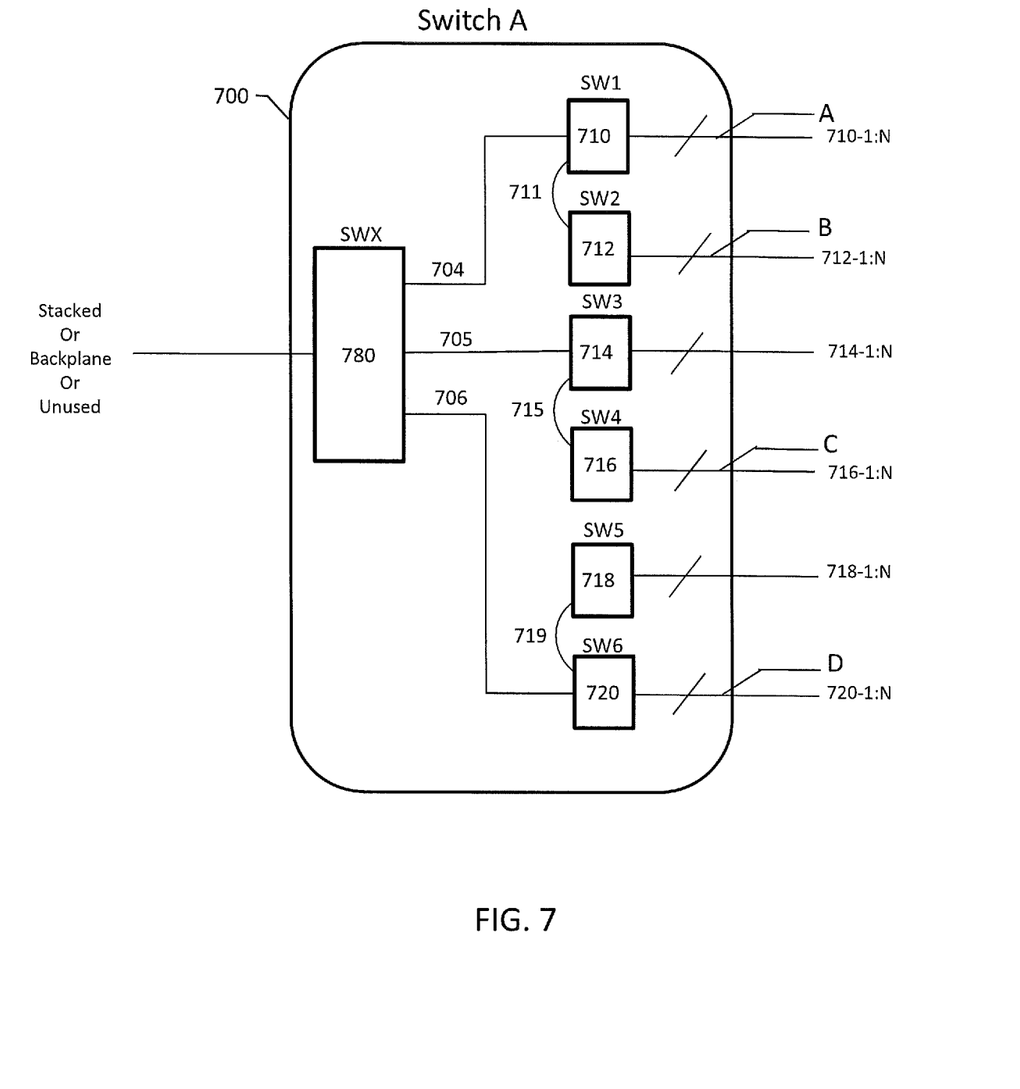
FIG. 7 is a block diagram of an example switch.

FIG. 7 is a block diagram of an example switch 700. Switch 700 may include a plurality of switching chips in communication with a higher capacity switch chip 780. Each switching chip may be in communication with another switch chip via an interconnect link. For example, switching chip 710 may be in communication with or connected to switching chip 712 via interconnect 711. However, not every switching chip may have a direct connection to every other switching chip, but each switching chip may be indirectly connected to the plurality of switching chips through the various interconnects.

Each switching chip of the plurality of switching chips may include a plurality of switch ports for communicating data to and from the respective switching chip, typically to end devices directly connected but external to switch 700. For example, switching chip 710 may include a plurality of switch ports 710-1:N, where N is the total number of switch ports and one of which is labelled "A". For example, N may be 12, 24, 48 or any "N" number of ports. Each of the plurality of switch ports for each switching chip may be equipped with a variety of network characteristics known to those of ordinary skill in the art, e.g., physical layer type, data transfer speed, and the like, and may include the physical layer types (PHYs) as detailed in IEEE 802.3 and other industry standards.

In some examples, a user may select switch port 710-A of switching port 710 as one member of a LAG configuration. Then, all of the LAG data will be limited to interconnect 711 if the source or destination is local to switching ports 712-1:N. Further, if port C is also included in the same LAG then a typical LAG distribution mechanism might try to evenly distribute traffic to it members. This will cause some of the traffic which enters ports on switching chip 712 to pass through SW1, be forwarded through the SWX chip and using interconnect 705 be sent to SW3 (714) and further forwarded through (715) to LAG port C via SW4 (716).

While LAG port C might be more optimal for ports on devices SW3 and SW4, it is likely sub-optimal for ports on devices SW1 and SW2 which require 2, 3, or even 4 internal interconnects to be traversed to reach the chip attached to the outgoing LAG port. Each of these interconnect traversals will have some delay and may be a bottleneck, introduce errors or affect other traffic. Optimizations may be made based on the interconnect speeds, number of interconnects traversed (hops), loading, delay characteristics or port counts active on each of the chips, in addition to the loading, placement, operational state and speed of LAG members.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein.

Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A packet forwarding device, comprising:
a plurality of physical ports for sending and receiving network traffic, wherein a first subset of the plurality of physical ports is associated with a first link aggregation group (LAG) and a second subset of the plurality of physical ports is associated with a second LAG; and
one or more packet processors configured to perform LAG distribution by distributing a plurality of incoming packets received at the packet forwarding device across a first plurality of active links of the first LAG and a second plurality of active links of the second LAG formed between the packet forwarding device and one or more network devices,
wherein the first LAG further comprises a third plurality of active links associated with a second packet forwarding device coupled to the packet forwarding device and wherein the second LAG further comprises a fourth plurality of active links associated with the second packet forwarding device,
wherein the one or more packet processors are configured, in a first distribution mode; to transmit a first plurality of packets from the plurality of incoming packets over a first subset of the first plurality of active links of the first LAG and not over the third plurality of active links associated with the second packet forwarding device,
wherein the one or more packet processors are further configured, in a second distribution mode, to transmit a second plurality of packets from the plurality of incoming packets over a second subset of the second and the fourth plurality of active links of the second LAG, and
wherein the first distribution mode is different from the second distribution mode.

2. The packet forwarding device of claim 1, wherein the packet forwarding device and the second packet forwarding device are arranged in a stacked hardware configuration and are connected by a stacking cable.

3. The packet forwarding device of claim 1, wherein the first distribution mode comprises a port-list distribution mode for the first LAG, and wherein the one or more packet processors are configured, in the port-list distribution mode, to distribute the first plurality of packets between at least a configurable number of physical ports of the first LAG on the packet forwarding device instead of one or more other physical ports of the first LAG on the second packet forwarding device.

4. The packet forwarding device of claim 3, wherein the packet forwarding device and the second packet forwarding device are arranged in a stacked hardware configuration and are connected by a stacking cable.

5. The packet forwarding device of claim 1, wherein the packet forwarding device is configured to receive a first command for establishing the first LAG and, after receiving the first command, receive a second command for selecting the first distribution mode.

6. The packet forwarding device of claim 1, wherein the one or more packet processors are configured, in the first distribution mode, to distribute the first plurality of packets across the first subset of the first plurality of active links of the first LAG based on one or more of loading, operational, or physical characteristics of the packet forwarding device.

7. The packet forwarding device of claim 1, wherein the one or more packet processors are configured, in the first distribution mode, to distribute a plurality of non-unicast packets for the first LAG based on one or more of: a closest link for the plurality of non-unicast packets based on a number of hops to the closest link; a least loaded link based on a network traffic statistic; and a least delayed link based on a network traffic delay statistic.

8. The packet forwarding device of claim 1, wherein the one or more packet processors are further configured to receive a single command for:
    establishing the first LAG using the first plurality of active links; and
    selecting the first distribution mode that restricts distribution of the first plurality of packets from the plurality of incoming packets to the first subset of the first plurality of active links of the first LAG.

9. The packet forwarding device of claim 8, wherein the one or more packet processors are further configured to receive a second command for establishing the second LAG and, after receiving the second command, receive a third command for selecting the second distribution mode.

10. A method performed by a first packet forwarding device comprising a plurality of packet processors, the method comprising:
    receiving, at the first packet forwarding device, a plurality of incoming packets, wherein the first packet forwarding device comprises a plurality of physical ports for sending and receiving network traffic, wherein a first subset of the plurality of physical ports is associated with a first link aggregation group (LAG) and a second subset of the plurality of physical ports is associated with a second LAG,
    wherein the first LAG comprises a first plurality of active links formed between the first packet forwarding device and one or more network devices and a third plurality of active links associated with a second packet forwarding device coupled to the first packet forwarding device, and
    wherein the second LAG comprises a second plurality of active links formed between the first packet forwarding device and the one or more network devices and a fourth plurality of active links associated with the second packet forwarding device;
    in a first distribution mode, distributing a first plurality of packets from the plurality of incoming packets over a first subset of the first plurality of active links of the first LAG and not over the third plurality of active links associated with the second packet forwarding device; and
    in a second distribution mode, distributing a second plurality of packets from the plurality of incoming packets over a second subset of the second and the fourth plurality of active links of the second LAG,
    wherein the first distribution mode is different from the second distribution mode.

11. The method of claim 10, wherein the first packet forwarding device and the second packet forwarding device are arranged in a stacked hardware configuration and are connected by a stacking cable.

12. The method of claim 10, wherein the first distribution mode comprises a port-list distribution mode, and, in the port-list distribution mode, the distributing the first plurality of packets comprises:
    distributing the first plurality of packets between at least a configurable number of physical ports of the first LAG on the first packet forwarding device instead of one or more other physical ports of the first LAG on the second packet forwarding device.

13. The method of claim 12, wherein the first packet forwarding device and the second packet forwarding device are arranged in a stacked hardware configuration and are connected by a stacking cable.

14. The method of claim 10, further comprising:
    receiving a first command for establishing the first LAG; and
    after receiving the first command, receiving a second command for selecting the first distribution mode.

15. The method of claim 10, wherein the distributing the first plurality of packets in the first distribution mode comprises:
    distributing the first plurality of packets to the first subset of the first plurality of active links of the first LAG based on one or more of loading, operational, or physical characteristics of the packet forwarding device.

16. The method of claim 10, further comprising:
    distributing, in the first distribution mode, a plurality of non-unicast packets for the first LAG based on one or more of: a closest link for the plurality of non-unicast packets based on a number of hops to the closest link; a least loaded link based on a network traffic statistic; and a least delayed link based on a network traffic delay statistic.

17. A packet forwarding device, comprising:
    a module comprising one or more physical ports for receiving and sending network traffic, wherein the module further comprises at least one switching controller configured to switch network traffic between the one or more physical ports, and wherein a first subset of the one or more of physical ports is associated with a first link aggregation group (LAG) and a second subset of the one or more of physical ports is associated with a second LAG; and
    one or more switches, each switch comprising at least one switch chip configured to:
        establish the first LAG using a first plurality of active links associated with the packet forwarding device and a third plurality of active links associated with a second packet forwarding device coupled to the packet forwarding device;
        establish the second LAG using a second plurality of active links associated with the packet forwarding device;

select a first distribution mode for the first LAG that restricts distribution of a first plurality of incoming packets to a first subset of the first plurality of active links of the first LAG;

in the first distribution mode, distribute the first plurality of incoming packets over the first subset of the first plurality of active links of the first LAG;

in a second distribution mode, distribute a second plurality of incoming packets over a second subset of the second plurality of active links, wherein the first distribution mode is different from the second distribution mode.

18. The packet forwarding device of claim 17, wherein the at least one switching controller is further configured to select, for the first plurality of incoming packets, a destination hardware circuit based on one or more of: a distance to the destination hardware circuit, a latency to the destination hardware circuit; whether or not the destination hardware circuit is on a same physical platform, and a priority mechanism.

19. The packet forwarding device of claim 17, wherein the module is coupled to a backplane, and wherein the module comprises the one or more physical ports in communication with the backplane and is configured to send and receive the network traffic via the backplane.

20. The packet forwarding device of claim 17, wherein the at least one switch chip is configured, in the first distribution mode, to distribute the first plurality of the incoming packets over the first subset of the first plurality of active links of the first LAG and not over the third plurality of active links associated with the second packet forwarding device.

21. The packet forwarding device of claim 17, wherein the at least one switch chip is configured to establish the second LAG using the second plurality of active links associated with the packet forwarding device and a fourth plurality of active links associated with the second packet forwarding device.

22. The packet forwarding device of claim 21, wherein the at least one switch chip is configured, in the second distribution mode, to distribute the second plurality of incoming packets over the second subset of the second plurality of active links of the second LAG and a third subset of the fourth plurality of active links of the second LAG.

* * * * *